United States Patent [19]

Wieland et al.

[11] Patent Number: 4,716,827
[45] Date of Patent: Jan. 5, 1988

[54] COUPLING FOR A SHEET FED ROTARY PRINTING PRESS

[75] Inventors: Erich G. Wieland; Wolfgang C. J. Spiess, both of Würzburg, Fed. Rep. of Germany

[73] Assignee: Koenig & Bauer Aktiengesellschaft, Fed. Rep. of Germany

[21] Appl. No.: 903,530

[22] Filed: Sep. 4, 1986

[30] Foreign Application Priority Data

Sep. 27, 1985 [DE] Fed. Rep. of Germany ....... 3534486

[51] Int. Cl.⁴ .................... B41F 13/12; B41F 21/00
[52] U.S. Cl. .................... 101/216; 101/230; 101/248
[58] Field of Search ............ 101/230, 231, 232, 216, 101/248, 181, 407 R; 74/395, 400, 401, 402, 403, 405, 406, 325, 333; 192/20, 21, 85 R

[56] References Cited

U.S. PATENT DOCUMENTS 2,658,596  11/1953  Archambauct ................ 192/20 X
2,684,737   7/1954  Johansson ...................... 192/20
4,444,106   4/1984  Frenzel et al. ................. 101/230
4,457,231   4/1984  Kawaguchi ................... 101/230

Primary Examiner—J. Reed Fisher
Attorney, Agent, or Firm—Jones, Tullar & Cooper

[57] ABSTRACT

A coupling for a sheet transfer drum in a sheet fed rotary printing machine facilitates phase or spacing adjustments between two printing couples. A toothed wheel is secured to a journal portion of a sheet transfer drum body. The toothed wheel carries a toothed ring on a support surface with the toothed ring being movable with respect to the toothed wheel through the use of a high pressure fluid injection interference fit. Movement of the toothed ring with respect to the toothed wheel by rotation of one of the printing couples with respect to the other effects a change in position of the sheet leading edge engaging gripper row carried by the sheet transfer drum periphery with respect to the sheet trailing edge engaging holding bar carried by the support segments connected to the toothed ring.

2 Claims, 1 Drawing Figure

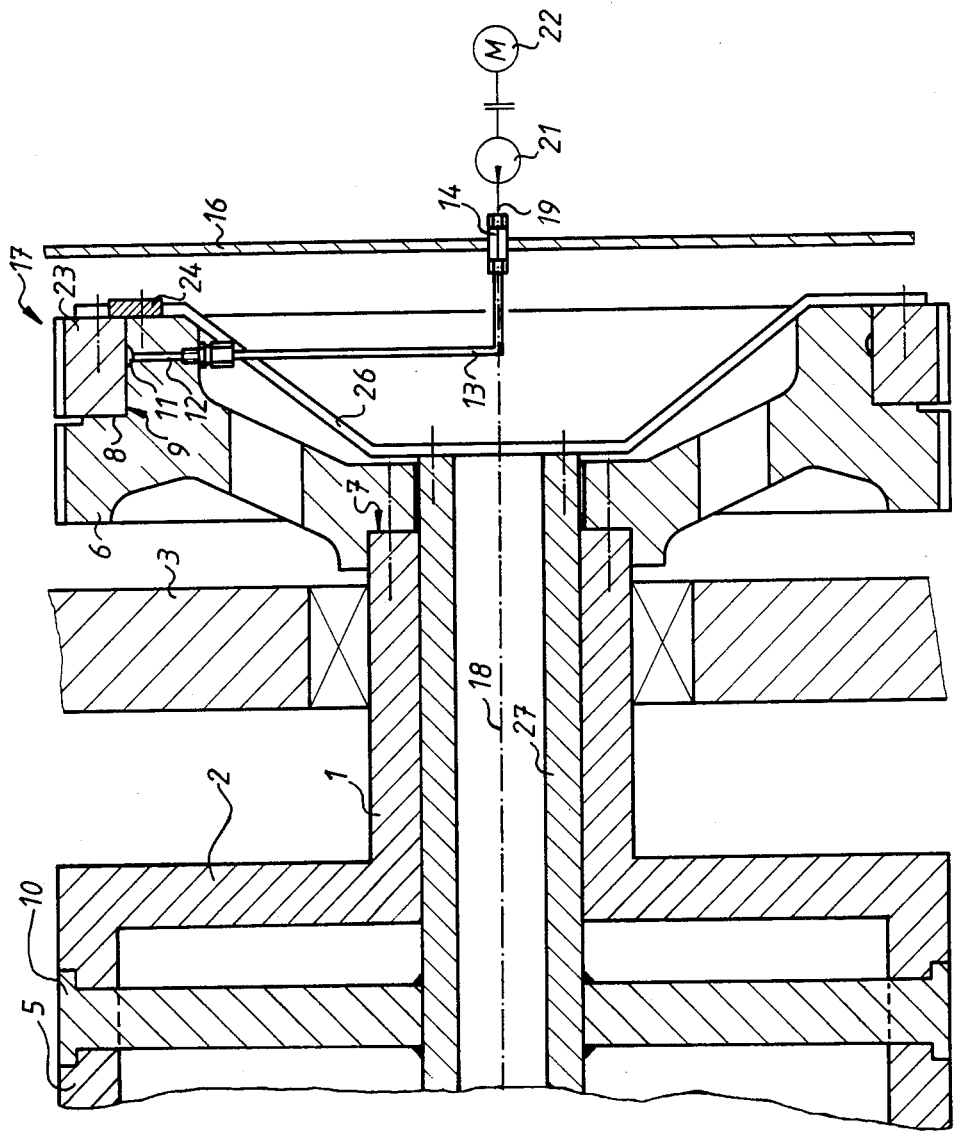

COUPLING FOR A SHEET FED ROTARY PRINTING PRESS

FIELD OF THE INVENTION

The present invention is directed generally to a coupling in a sheet fed rotary printing press. More particularly, the present invention is directed to a phase or size adjustable coupling for a sheet transfer drum in a sheet fed rotary printing press. Most specifically, the present invention is directed to a coupling for a sheet transfer drum in which the coupling utilizes a pressurized fluid injection interference fit. The sheet transfer drum carries a toothed wheel and a toothed ring with the ring being adjustably mounted on a shoulder formed on the toothed wheel. Relative rotational motion is made possible between the toothed wheel and toothed ring by the coupling assembly. This relative motion allows the transfer drum to be adjusted such as when changing from recto to recto and verso printing or when changing sheet size so that the sheet transfer drum transport assemblies will be properly positioned.

DESCRIPTION OF THE PRIOR ART

Sheet fed rotary printing machines which are capable of being switched between recto or recto and verso printing, and which are adjustable for various sizes of sheets being printed are generally known in the art. In such situations, in which a sheet transfer drum is typically interposed between adjacent printing couples, it is necessary to adjust the positions of the various sheet transport components, such as gripper fingers, on the periphery of the sheet transfer drums. U.S. Pat. No. 4,457,231 to Kawaguchi is exemplary of a prior art device for adjusting the phase of spacing of elements on a sheet transfer drum in a sheet fed rotary printing machine. In devices of this general type, a toothed wheel carries a toothed ring. The toothed ring is urged axially onto the toothed wheel through the use of clamping plates. These plates are, in turn, urged on one side of the toothed ring by either springs or two-armed levers that act on bolts which are connected to the clamping plates. A central screw, that is equipped with a collar, is loosened to detach the clamping plates from the flank of the tooth ring. The toothed ring, which meshes with a toothed wheel of a first inking unit, is turned to accomplish the desired phase or spacing adjustment. Once the adjustment has been made, the central screw is screwed back in to again urge the toothed ring to the toothed wheel by use of the clamping plates.

Prior art sheet transfer drum phase or spacing adjusting coupling assemblies have required numerous, rather complex parts and particularly have utilized expensive and rapidly wearing joints. These have required additional assemblies to provide adjusting means which compensate for the wear of the component parts of the prior art couplings. Futhermore, by applying clamping forces at only several spaced locations about the periphery of the toothed wheel or toothed ring, compressive stress peaks have been created in these prior art adjustment assemblies.

It will thus be apparent that a need exists for a coupling for a sheet transfer drum which is uncomplicated, long wearing, accurate and quickly changeable. The sheet transfer drum adjustable coupling of the present invention provides such a device.

SUMMARY OF THE INVENTION

It is an object of the present invention to provide a coupling for a sheet transfer drum in a sheet fed rotary printing machine.

A further object of the present invention is to provide a convertible coupling in a driving toothed wheel train of a sheet fed rotary printing machine.

Another object of the present invention is to provide a remote controlled coupling for a sheet transfer drum in a sheet fed rotary printing machine capable of being switched between recto or recto and verso printing.

Yet a further object of the present invention is to provide a coupling for a sheet transfer drum in a sheet fed rotary printing machine capable of being adjusted for different sized sheets.

Still another object of the present invention is to provide a coupling for a sheet transfer drum having a toothed wheel and a toothed ring.

Yet still a further object of the present invention is to provide a coupling for a sheet transfer drum which uses a pressure fluid interference fit between the toothed wheel and toothed ring.

As will be discussed in greater detail in the description in the preferred embodiment which is set forth subsequently, the sheet transfer drum assembly of the present invention includes a drum body having a journal which passes through side frames of the printing press and which carries a toothed wheel. A plurality of adjustable support segments are spaced on the body of the drum and are connected to a central shaft which is coaxial and concentric with the drum journal. The central shaft is connected to a toothed ring which is carried on a shoulder or step on the periphery of the toothed wheel in a friction fit. The toothed ring is rotatable with respect to the toothed wheel upon application of high pressure fluid between the wheel and ring.

The coupling of the sheet transfer drum of the present invention has several advantages over prior art devices. Detachment of the coupling is possible without actuating the connecting machine elements. An even tensioning of the component parts may be obtained when the coupling is in a separated state. The coupling is simple, quick and easy to operate, and is an outstanding component part in an automatic size change or phase change arrangement in a sheet fed rotary printing machine that can be adjusted for use with varying sheet sizes and that can be switched between recto or recto and verso printing. Since the coupling of the present invention is so quick and easy to operate, it substantially reduces set up time when the printing machine is being converted.

The coupling for a sheet transfer drum in accordance with the present invention requires no additional installation space and can handle very high torque forces. It is particularly well suited for use as a coupling between two sheet supporting members such as printing couples which are adjustable with respect to each other in a circumferential direction. Such sheet support members typically can be converted between recto or recto and verso printing. These support members usually have a first support arrangement which is equipped with controllable grippers to grip the leading edge of a sheet, and a second support arrangement which is equipped with a controllable sheet holding arrangement for the second or trailing end of the sheet.

The coupling for a sheet transfer drum in accordance with the present invention avoids the somewhat cumbersome mechanical arrangements of the prior art devices. At the same time, it provides a means for adjusting the phase or spacing of the transfer drum's plurality of support segments in an efficient uncomplicated manner.

BRIEF DESCRIPTION OF THE DRAWING

While the novel features of the coupling for a sheet fed rotary printing press in accordance with the present invention are set forth with particularity in the appended claims, a full and complete understanding of the invention may be had by referring to the detailed description of the preferred embodiment, as set forth hereinafter and as may be seen in the sole accompanying drawings which is a side elevation view, partly in section, of the coupling for a sheet transfer drum in accordance with the present invention.

BRIEF DESCRIPTION OF THE PREFERRED EMBODIMENT

Referring to the sole drawing figure, there may be seen a portion of a sheet transfer drum and coupling assembly in accordance with the present invention. Sheet transfer drum body 2 includes a pair of hollow journals 1, only one of which is shown in the drawing. These hollow journals 1 are supported for rotation by suitable bearings carried in side frames 3. Sheet transfer drum body 2 includes an outer peripheral surface 5 that has a plurality of rotatable support segments 10 spaced axially therealong. Each of these rotatable support segments 10 is rigidly secured to an axially extending shaft 27. Shaft 27 and hollow journals 1 share a common axis 18 with shaft 27 being carries within the hollow journal 1 and extending axially outwardly beyond an end face 7 of hollow journal 1. While not specifically shown, it will be understood that the outer peripheral surface 5 of sheet transfer drum body 2 may be provided with suitable gripper abutment surfaces. A gripper spindle, supported with grippers, may also be provided. Similarly, the plurality of support segments 10 may include generally well known vacuum type holding bars or similar sheet grasping means. Since these various sheet beginning and sheet end grasping means form no part of the present invention, they have been omitted for purposes of clarity.

A toothed wheel, generally at 6, is secured to the end face 7 of hollow journal 1 of sheet transfer drum body 2 by suitable screws or other similar fastening means (not shown). Toothed wheel 6 has an outer peripheral toothed surface across a portion of its width and a shoulder or step 8 of reduced diameter across the rest of its outer peripheral surface. Shoulder 8 leads to a generally cylindrical or conically tapered support surface 9. As may be seen in the drawing figure, an oil distribution groove 11 is formed in the support surface 9 and extends around the entire circumference of surface 9. An oil supply borehole 12 is formed in the toothed wheel 6 and communicates with the oil distribution groove 11 at a first, outboard end, and with an oil or other fluid hydraulic supply pipe 13 at a second, inboard end through a suitable fitting. A swivel lead-in 14 is placed in a cover 16 of wheel box 17 secured to side frames 3 and is aligned with axis 18. Hydraulic pipe 13 is joined to the interior end of swivel lead-in 14 and a fluid supply line 19 is connected to the exterior end of swivel lead-in 14. Fluid supply line 19 is provided with hydraulic fluid under pressure by a suitable hydraulic pump 21 which is driven by an electric motor 22.

A toothed ring 23 is shrunk fit onto support surface 9 and has an outer toothed periphery of the same circumference as the outer toothed surface of toothed wheel 6. A plurality of limit pieces 24 are affixed to the front surface of toothed wheel 6 and have portions which overlie to the end face of toothed ring 23 thereby preventing ring 23 from moving axially. A plurality of cross pieces 26 extend between the end face of toothed ring 23 and the support segment shaft 27. Thus, rotation of toothed ring 23 with respect to toothed wheel 6 will cause a corresponding movement of the holding bar carrying support segments 10 with respect to outer peripheral surface 5 of sheet transfer drum body 2.

When it is desired to rotate toothed ring 23 with respect to toothed wheel 6, a suitable fluid such as a hydraulic oil at a pressure of approximately 150–200 bar is forced into oil distribution groove 11 through pipes 19 and 13 via swivel 14 by motor driven pump 21. This high pressure hydraulic oil in oil distribution groove 11 is delivered to the support surface 9 between toothed wheel 6 and toothed ring 23 and forms a dividing fluid film so that the toothed ring 23 may be rotated about the toothed wheel 6 to thereby vary the position of the plurality of support segments 10 with respect to the outer peripheral surface 5 ofthe sheet transfer cylinder body 2. When the relative positions of wheel 6 and ring 23 have been adjusted, as desired, the hydraulic fluid pressure is removed from oil distribution grove 11 by turning off the pump 21 and draining the lines.

In a typical use situation, the sheet transfer drum 2 with its toothed wheel 6 and toothed ring 23 lie in a toothed wheel drive train between two printing couples of a sheet fed rotary printing machine. By application of hydraulic pressure to the oil distribution groove 11, as discussed above, one of the coupling elements; i.e., toothed wheel 6 and toothed ring 23 can be made to move with respect to the other. One of the printing couples is held in position by suitable means while the second printing couple is turned in relation to the first through a predetermined angle by a suitable known drive means. Although the gripper row and holding bars are all part of the same sheet transfer drum, the gripper rows follow the motion of the toothed wheel 6 while the holding bars follow the movement of the toothed ring 23. Since wheel 6 and ring 23 may now move with respect to each other, rotation of one of the printing couples with respect to the other will shift the spacing or phase of the gripper row or rows with respect to the holding bar. After the proper adjustment has been completed, the wheel and ring may be reconnected by removal of the high pressure fluid from oil distribution groove 11.

While a preferred embodiment of a coupling for a sheet fed rotary printing machine in accordance with the present invention has been fully and completely set forth hereinabove, it will be obvious to one of skill in the art that a number of changes in, for example, the type of gripper row and holding bar used, the size of the sheet transfer drum, the number of teeth on the toothed wheel and ring, the type of fluid and pump and motor used, and the like could be made without departing from the true spirit and scope of the subject invention which is accordingly to be limited only by the following claims.

What is claimed is:

1. A sheet transfer drum assembly interposed between first and second toothed drive trains for a sheet fed rotary printing machine, said sheet transfer drum including first and second relatively rotatable sheet transport assemblies which are selectively rotatably joined to each other through a coupling, said coupling comprising:
- a toothed wheel secured to a first of said relatively rotatable sheet transport assemblies of said sheet transfer drum, said toothed wheel having an outer peripheral surface, a first portion of said outer peripheral surface carrying teeth and a second portion of said outer peripheral surface of said toothed wheel carrying an adjacent reduced diameter support surface;
- a toothed ring carried on said support surface and secured to a second of said relatively rotatable sheet transport assemblies of said sheet transfer drum, said toothed wheel and said toothed ring being selectively rotatable with respect to each other and being selectively connectable to each other by a pressure oil injection interference fit; and
- a switchable pressure oil source adapted to selectively supply and remove oil under pressure to said reduced diameter support surface, said toothed wheel and said toothed ring being rotatable with respect to each other when said oil under pressure is supplied to said support surface and being connected to each other when said oil is removed from said support surface.

2. A coupling interposed between first and second spaced toothed drive trains of a sheet fed printing machine for recto and verso printing, said coupling comprising:
- a drive toothed wheel for a first printing couple of said printing machine, said toothed wheel including an outer peripheral surface, a first portion of said outer peripheral surface carrying teeth and a second portion of said outer peripheral surface of said toothed wheel carrying a reduced diameter support surface;
- a drive toothed ring for a second printing couple of said printing machine, said drive toothed ring being supported on said support surface of said drive toothed wheel said drive toothed wheel and said drive toothed ring of said coupling being selectively rotatable with respect to each other and being selectively connectable to each other;
- a pressure oil injection interference fit formed between said reduced diameter support surface portion of said toothed wheel and said toothed ring, and oil distribution slot being formed on said support surface of said toothed wheel; and
- a switchable pressure oil source adapted to selectively supply oil to said oil distribution slot and to remove oil therefrom, said drive toothed wheel and said drive toothed ring being rotatable with respect to each other when said oil under pressure is supplied to said oil distribution slot and being connected to each other when said oil is removed.

* * * * *